United States Patent [19]

Alley et al.

[11] Patent Number: 5,004,505

[45] Date of Patent: Apr. 2, 1991

[54] MAGNESIUM OXYCHLORIDE CEMENT COMPOSITIONS AND METHODS FOR MANUFACTURE AND USE

[75] Inventors: Russell I. Alley; George E. Caine, both of Salt Lake City, Utah

[73] Assignee: CAC, Inc., Salt Lake City, Utah

[21] Appl. No.: 267,443

[22] Filed: Nov. 4, 1988

[51] Int. Cl.$^5$ .............................................. C04B 9/02
[52] U.S. Cl. .................................. 106/685; 106/686; 106/688
[58] Field of Search ............... 106/106, 107, 108, 685, 106/686, 688

[56] References Cited

U.S. PATENT DOCUMENTS

| | | | |
|---|---|---|---|
| 1,667,721 | 5/1928 | Copeman | 106/106 |
| 2,462,030 | 2/1949 | Whitehead | 106/688 |
| 2,543,959 | 3/1951 | Eastin | 106/685 |
| 2,605,190 | 7/1952 | Woodward et al. | 106/685 |
| 3,353,975 | 11/1967 | Shannon et al. | 106/675 |
| 3,565,650 | 2/1971 | Cordon | 106/675 |
| 3,667,978 | 6/1972 | Vassilevsky | 106/687 |
| 3,719,512 | 3/1973 | Danielis | 106/687 |
| 3,745,031 | 7/1973 | Kaplan | 106/684 |
| 3,816,147 | 6/1974 | Vassilevsky | 106/618 |
| 3,951,885 | 4/1976 | Thompson | 521/137 |
| 3,963,849 | 6/1976 | Thompson | 428/182 |
| 3,969,453 | 7/1976 | Thompson | 106/18.25 |
| 4,055,519 | 10/1977 | Thompson | 521/119 |
| 4,141,744 | 2/1979 | Prior et al. | 106/617 |
| 4,158,570 | 6/1979 | Irwin | 106/683 |
| 4,170,248 | 10/1979 | Bennett et al. | 138/97 |
| 4,209,339 | 6/1980 | Smith-Johannsen | 106/686 |
| 4,352,694 | 10/1982 | Smith-Johannsen | 106/685 |
| 4,572,862 | 2/1986 | Ellis | 106/686 |
| 4,761,342 | 8/1988 | Bjorhaag et al. | 428/537.1 |

FOREIGN PATENT DOCUMENTS 1562154 3/1980 Canada .

0172218 7/1965 U.S.S.R. .............................. 106/106

OTHER PUBLICATIONS

Coope, B., "Caustic Magnesia Markets—agricultural oversupply and industrial underdemand," Industrial Minerals (Feb. 1981), pp. 43–51.

Kurdowski, W. and Sorrentino, F., "Special Cements", Structure and Performance of Cents, ch. 10, various excerpts, Applied Science Publishers Ltd. (1983).

Lea, F. M. The Chemistry of Cement and Concrete, Edward Arnold Publishers Ltd. (1970), various excerpts.

The Merck Index, Tenth Edition (1983), pp. 810–811.

*Primary Examiner*—William R. Dixon, Jr.
*Assistant Examiner*—Anthony J. Green
*Attorney, Agent, or Firm*—Workman, Nydegger & Jensen

[57] ABSTRACT

Magnesium oxychloride cement compositions, products, and uses thereof, are provided by mixing magnesium oxide, a magnesium chloride solution, and aggregate particles. The cement compositions are adapted for use in repairing damaged concrete surfaces, casting both functional and decorative forms, and coating surfaces with stucco. The addition of a small amount of acid to the cement composition promotes a more complete cementing reaction. The resulting cement product exhibits substantially increased strength and water resistance. Brine from the Great Salt Lake is a preferable source of the magnesium chloride solution. Brine from the Great Salt Lake results in a cement composition substantially stronger than cement produced from a pure magnesium chloride solution. Use of the Great Salt Lake brine as the gauging solution in lieu of a gauging solution made from magnesium chloride flakes (hexahydrate) reduces manufacturing costs of magnesium oxychloride cement products.

42 Claims, No Drawings

MAGNESIUM OXYCHLORIDE CEMENT COMPOSITIONS AND METHODS FOR MANUFACTURE AND USE

BACKGROUND

1. The Field of the Invention

The invention relates to cement compositions and products, and the methods of manufacturing and using such compositions. More particularly, the present invention is directed to novel magnesium oxychloride cement compositions, products, and uses thereof.

2. Review of the Technology

Cement and cementitious products affect everyone, from the roads we drive on, to the buildings we work in, to the homes we live in. Early principles and applications of cement and cement products were known anciently. The Romans, for example, developed cements and cement products to a high degree of sophistication. Despite centuries of knowledge concerning cements and cement products and despite countless variations of cement compositions, problems still arise while using cements which heretofore have not been adequately solved.

One of the most important uses of cement compositions is in concrete. As used herein, the term "concrete" is broadly defined as a hard strong building material made by mixing a water-cement mixture with a mineral aggregate such as sand and gravel. The cement acts as a glue to bind the aggregate particles together The physical properties of concrete vary depending on the cement composition and upon the choice of aggregates.

Concrete is commonly used to construct driveways, sidewalks, floors, and roads (hereinafter referred to generically as "road surfaces"). Concrete road surfaces are usually constructed of Portland cement. Although Portland cement is the industry standard, it is generally slow setting and requires a substantial cure time to reach an acceptable strength. In fact, it has been estimated that Portland cement does not reach full strength for about 100 years.

Despite careful selection of cement and aggregate, virtually all concrete road surfaces crack, chip, spall, or experience damage to one degree or another. The weather, the size and type of vehicles which travel on the road surfaces, as well as the quality of concrete and the skill in laying the concrete, influence the extent of damage to the concrete surface. In addition, reinforced concrete roads are often damaged when deicing salt is absorbed by the concrete. When the salt reaches the reinforcing steel, corrosion occurs, causing expansion and destruction of the road surface.

Once a concrete road surface is damaged, it is important to repair the damage in order to reduce the severity of future damage. Repairing damaged concrete surfaces, as referred to in this specification, implies restoring the damaged concrete surface to a state functionally equivalent to the undamaged state. The damaged surface may be patched, filled, resurfaced with thin or thick coatings, or restored in some other manner known in the art, depending on the circumstances and the type of damage.

There are many products on the market for repairing damaged concrete surfaces Historically, concrete was repaired by applying new concrete or mortar to the damaged area. This technique was not a long-term solution to the problem because the new concrete or mortar shrinks when it sets, thereby weakening or destroying the bond between the two surfaces.

In recent years, resin or epoxy-type materials have been used to repair damaged concrete surfaces. It was hoped that the resin cements with appropriate aggregates would solve the problems of traditional concrete repair compositions. Resin cements are fast setting and strong, but they are also expensive.

A common problem with epoxy-type cement compositions is that they set too fast, so fast that the epoxy-type cements have been known to harden before the user can properly apply and spread the composition over a damaged concrete surface. In addition, resin cements require the proper addition of special curing agents in order to adequately harden. Also, resin cements are adversely effected by ultraviolet rays which reduces their useful life. Unfortunately, even though such epoxy-type cements appear to form a good bond with the deteriorating road surface, it has been observed that the epoxy-type cements also fail with age and with heavy use.

Another important use of cement compositions is in exterior plaster and stucco applications, hereinafter referred to as stucco. Stucco is a popular exterior covering for residential and commercial buildings, particularly in the western United States. Historically, exterior stuccos have consisted of a Portland cement composition. Stucco wire or metal lath is usually placed over the exterior surface in order to support the cement stucco. In addition, paper or some other material is typically placed between the stucco composition and the substrate as a moisture barrier.

It is generally accepted that stucco applied directly to the substrate without wire or paper would crack and fail as the substrate expands, contracts, or bends due to the lack of adequate bond between the surface coating and the substrate. Multiple coats of the Portland cement stucco have been necessarily applied over a period of days with a normal curing time of five (5) days between coats in order to have a satisfactory product. Unfortunately, these cement stucco compositions tended to crack and shrink with age.

Moreover, when Portland cement stucco compositions are applied over a concrete block wall, the stucco composition "photographs" the mortar joints "Photographing" is a phenomenon which results because the mortar joints and concrete blocks absorb different amounts of water from the stucco composition. As a result, stucco applied over the mortar joints cures at a different rate than stucco applied over the concrete block. Consequently, stucco over the mortar joints has a different color than stucco over the concrete blocks.

In recent years, resin cement stuccos have been used instead of Portland cement stuccos. It was believed that these resin cement stuccos would overcome some of the problems associated with Portland cement stuccos. Unfortunately, it has been found that resin cement stuccos are subject to deterioration by heat and ultraviolet rays. Therefore, resin cement stuccos are subject to failure with age and exposure to the sun. In addition, the costs of construction using these resin cement stuccos can even surpass the costs of construction with brick veneer and commonly used exterior wall coverings.

Other examples illustrating additional uses of cement compositions would further demonstrate the need in the art for improved cement compositions. Nevertheless, from the foregoing, it will be appreciated that it would be a significant advancement in the art to provide cement compositions which possess a high structural strength, and yet have a high bonding strength to common substrates.

In addition, it will be appreciated that it would be an advancement in the art to provide relatively fast setting cement compositions which do not set so fast as to prevent adequate "working" of the compositions to form the desired product.

Additionally, it would be a further advancement in the art to provide cement compositions which do not shrink upon setting in order that a good bond can be formed with the adjacent surfaces, such as when used to repair deteriorating concrete road surfaces.

It would be yet another advancement in the art to provide cement compositions which are resistant to weather exposure, including heat, ultraviolet rays, and deicing salts.

It would be still another advancement in the art to provide cement compositions which do not require special curing compositions or techniques.

It would be an additional advancement in the art to provide cement stucco compositions which can be applied directly to a substrate surface without the need of costly stucco wire and without the need of labor intensive multiple coatings.

The foregoing, and other features and objects of the present invention are provided by the invention which is disclosed and claimed herein.

BRIEF SUMMARY AND OBJECTS OF THE INVENTION

The present invention is directed to novel magnesium oxychloride cement compositions and products, and the methods of manufacturing and using such compositions and products. The cement compositions within the scope of the present invention are advantageously adapted for use in repairing damaged concrete surfaces, casting both functional and decorative forms, and coating substrates with a stucco-like surface.

The present invention represents an improvement on the basic Sorel cement system. The basic Sorel system consisted of calcined magnesia (MgO, also known as magnesium oxide) mixed with an aqueous solution of magnesium chloride ($MgCl_2$). In the present invention, the ratio of magnesium oxide to magnesium chloride in the cement composition is carefully controlled. In addition, the ratio of cement composition to aggregate particles (both size and quality of the aggregate particles) is carefully adjusted depending upon the desired end use.

Moreover, it has been found that the addition of a small amount of concentrated acid to the cement composition promotes a more complete cementing reaction. The resulting cement product exhibits substantially increased strength and water resistance. It has also been found that the use of brine from the Great Salt Lake as a source of magnesium chloride results in a cement composition which is not only less expensive than cement compositions made from pure magnesium chloride solutions, but also substantially stronger.

An exemplary concrete repair composition within the scope of the present invention includes about 15% to about 25% magnesium oxide, about 15% to about 25% magnesium chloride solution, and the remainder a combination of differently sized aggregate particles. The magnesium chloride solution preferably has a specific gravity in the range from about 20° Baumé to about 30° Baumé. When used for a concrete repair composition, the present invention utilizes aggregate particles selected to minimize voids and interstitial spaces between the aggregate particles, thereby resulting in a dense concrete repair composition. Acid may also be added to the concrete repair composition up to about 10% of the magnesium chloride solution by weight to increase compressive strength, reduce set time, and lower the freezing temperature.

The concrete repair compositions within the scope of the present invention possess exceptional high early strength, as well as high bondability to damaged concrete surfaces. In addition, these concrete repair compositions do not shrink upon setting and have been found to be very weather resistant.

An exemplary stucco composition within the scope of the present invention includes about 10% to about 20% magnesium oxide, about 15% to about 25% magnesium chloride solution, and the remainder a combination of differently sized, relatively small aggregate particles, such as on the order of about #16 to about #200 silica sand properly graded to produce the desired mix. Acid, up to about 10% of the magnesium chloride solution by weight, may be added to increase the strength of and to control the setting time and freezing temperature of the resulting composition. The magnesium chloride solution preferably has a specific gravity in the range from about 20° Baumé to about 30° Baumé.

The stucco compositions within the scope of the present invention exhibit exceptional bond strength to a wide variety of substrates. Moreover, these stucco compositions may be applied in a single coat directly on the substrate, without the need to use stucco wire and water impervious paper unless specifically required by building codes. Once applied, the resultant stucco has been found to resist the formation of cracks even when exposed to prolonged cycles of heat and cold. Furthermore, tests indicate that the stucco compositions within the scope of the present invention possess excellent weather resistance to water, heat, and light and that the stucco compositions do not "photograph" underlying mortar joints when applied to block and brick masonry.

An exemplary castable concrete composition within the scope of the present invention includes about 10% to about 25% magnesium oxide, about 15% to about 40% magnesium chloride solution, and a combination of differently sized aggregate particles. Acid, up to about 10% of the magnesium chloride solution by weight, may also be added to the castable concrete composition to increase the strength and water resistance of the composition as well as reduce the set time and freezing temperature. The magnesium chloride solution preferably has a specific gravity in the range from about 20° Baumé to about 30° Baumé.

It has been found that the castable concrete compositions within the scope of the present invention produce high quality castings of both functional and ornamental products. In the case of art castings, compositions within the scope of the invention can produce a "finished surface" without the need for firing or glazing the product. It has also been found that an exceptionally smooth and accurate casting may be achieved by utilizing well graded aggregate, proper cement to aggregate ratio, and selection of the mold surface to produce the desired surface finish. For example, for a smooth polished finish, a mixture of aggregate particles ranging in size from about #8 silica sand to about #200 silica sand has been found to be satisfactory.

It is, therefore, an object of the present invention to provide cement compositions which possess a high structural strength, and yet have a high bonding strength to common substrates.

Another important object of the present invention is to provide relative fast curing cement compositions, but which do not set so fast as to prevent adequate "working" of the compositions to form the desired end product.

An additional object of the present invention is to provide cement compositions which do not shrink upon setting in order that a good bond can be formed with the adjacent surface, such as when used to repair deteriorating concrete road surfaces.

A further important object of the present invention is to provide cement compositions which are resistant to weather exposure, including heat, ultraviolet rays, and deicing salts.

Yet another important object of the present invention is to provide cement compositions which do not require special curing compositions or techniques that would inhibit their use for common construction projects.

An additional important object of the present invention is to provide cement stucco compositions which can be applied directly to a substrate surface without the need of costly stucco wire and without the need of labor intensive multiple coatings of the stucco compositions.

Still another important object of the present invention is to provide cement compositions which can be cast into both functional and ornamental products and which can produce a finished surface without the need for firing or glazing the product.

A further important object of the present invention is to provide cement compositions for repairing damaged and deteriorating concrete surfaces.

These and other objects and features of the present invention will become more fully apparent from the following description and appended claims or may be learned from the practice of the invention.

DETAILED DESCRIPTION OF THE PREFERRED EMBODIMENTS

The present invention is directed to novel magnesium oxychloride cement compositions and products, and methods of their manufacturing and use. The cement compositions within the scope of the present invention represent an improvement upon the old Sorel cement which has been used since about 1870. The basic Sorel system consisted of calcined magnesia (magnesium oxide) mixed with an aqueous solution of magnesium chloride. Another known method of forming magnesium oxychloride cement is to combine magnesium oxide with crystalline magnesium chloride and later add water. However, it is preferable to mix a suitable magnesium chloride solution with the dry magnesium oxide.

The basic Sorel cement formulation is known to possess undesirable characteristics. For example, magnesium oxychloride cement has been recognized by some as being susceptible to deterioration by water. Part of the weathering and disintegration process has been traced to a lack of homogeneity in the cementing action. It is believed by some that the nonhomogeneous cementing action is caused by the presence of free magnesium oxide and magnesium chloride molecules within the structure. It is theorized that free magnesium chloride within the structure tends to hydrolyze and expand, thereby creating warping and cracking fissures in the cement. The magnesium oxide itself tends to hydrate and expand in the presence of water. This further contributes to intra-structural deterioration.

The existence of these undesirable characteristics has discouraged the widespread use of magnesium oxychloride cements. The high cost of the raw materials for the cement composition has also discouraged their use in the art.

Despite the foregoing undesirable characteristics of known magnesium oxychloride cements, it has been found that certain modifications to the basic Sorel cement composition provide a remarkably versatile cement possessing exceptional physical characteristics.

For example, it has been found that the magnesium chloride solution used in prior magnesium oxychloride cements may be advantageously replaced with a concentrated brine solution from the Great Salt Lake. The Great Salt Lake brine not only is significantly less expensive than known magnesium chloride solution sources, but also results in a cement composition possessing unexpectedly higher strength.

Although it is not intended to limit the present invention to any specific theory of action or mechanism, it is believed that existence of salts and mineral elements other than magnesium chloride, in the brine solution synergistically react with the magnesium oxide producing the higher strength cement composition. Table I illustrates a typical composition of Great Salt Lake brine:

TABLE I

Chemical Analysis (Weight Percent) and Physical Properties of Great Salt Lake Brine

|  |  | Typical | Range |
| --- | --- | --- | --- |
| Magnesium Chloride | $MgCl_2$ | 32.0 | 28.0–35.0 |
| Chloride | Cl | 23.8 | 19.8–27.0 |
| Magnesium | Mg | 8.2 | 6.8–9.2 |
| Sulfate | $SO_4$ | 2.4 | 1.2–3.5 |
| Sodium | Na | 0.6 | 0.2–1.0 |
| Potassium | K | 0.5 | 0.1–0.8 |
| Lithium | Li | 0.1 | 0.1–0.2 |
| Bromine | Br | 0.1 | 0.1–0.2 |
| Iron | Fe | 8 ppm | 5–10 ppm |
| Specific Gravity |  | 1.32 | 1.27–1.36 |
| Bulk Density |  | 11 lbs/gallon |  |

It will be understood that there is no direct affinity between magnesium oxide and magnesium chloride when both are in a dry state. When water is added, a chemical bond is formed between the two constituents to constitute the magnesium oxychloride cement. It is believed that the resulting cement composition has a chemical formula of either $3MgO \cdot MgCl_2 \cdot 11H_2O$ or $5MgO \cdot MgCl_2 \cdot 13H_2O$ or a combination thereof.

It will be appreciated that 11 or 13 molecules of water are necessary to form the cementitious molecule. The six waters of hydration normally associated with magnesium chloride crystals is not sufficient for the chemical bond, and the necessity for the presence of a suitable amount of additional water is apparent. Therefore, a magnesium chloride solution having a proper ratio of magnesium chloride to water is important to achieve a proper cementing reaction.

It has been found that a magnesium chloride solution having a specific gravity in the range from about 20° Baumé to about 30° Baumé is a suitable gauging solution. Degrees on the Baumé scale simply relate to the specific gravity of the solution. For liquids heavier than water, 0° Baumé corresponds to a specific gravity of 1.000 (water at 4° C.) and 66° Baumé corresponds to a specific gravity of 1.835. Degrees Baumé may be easily calculated by using the following formula:

$$d = m - m/s$$

where m is 145 and s is the specific gravity.

Commercially available, concentrated Great Salt Lake brine typically has a specific gravity in the range from about 1.27 to about 1.36. As shown in Table I, this brine includes several salts and chemicals other than magnesium chloride. Furthermore, many variables such as temperature, humidity, and season affect the specific gravity of the brine. For example, high rain and snow runoff dilute the concentration of the minerals in the Great Salt Lake. Commercially available brine is a by-product, i.e., a waste liquor, from a potash (potassium chloride) producing facility.

In actual production, the brine from the Great Salt Lake is pumped out of wells and conducted to settling pools where the sodium chloride, due to a natural evaporation process, precipitates out of solution when the brine becomes sufficiently concentrated. Subsequently, the remaining brine is pumped to a plant wherein potash is removed from the brine by flotation. The remaining residual liquor is a highly concentrated solution of magnesium chloride, with small amounts of other mineral salts and elements being present. The Great Salt Lake brine is directly usable as a gauging solution for magnesium oxychloride cements.

For practical production and significant saving in cost, it has been found that it is not necessary for the brine to be concentrated to the crystalline hexahydrate form in order to ship the magnesium chloride. Hence, the magnesium chloride could actually be shipped in a concentrated aqueous solution and reduced to the desired specific gravity before dispensing for use.

Prior to combining with magnesium oxide, the concentrated magnesium chloride solution is preferably diluted with a sufficient amount of water in order to obtain a gauging solution having a specific gravity in the range from about 20° Baumé to about 30° Baumé. It is preferred that the gauging solution be at the correct Baumé before the magnesium oxide is added to the aggregate and magnesium chloride solution. Otherwise, a rapid reaction might take place to interfere with the complete reaction of the chemicals.

The magnesium oxide and the magnesium chloride solution should preferably be kept separately and only combined on the job site or at least in the vicinity of the job site. Were these ingredients precombined, deleterious effects, such as a pre-cementing action and water absorption problems, would most certainly occur.

It is important to note that water should not be first mixed with the magnesium oxide prior to adding magnesium chloride, since the magnesium oxide tends to hydrate and become magnesium hydroxide upon the addition of water. Magnesium hydroxide is a totally different compound than magnesium oxide, it is insoluble in water, and it does not combine with magnesium chloride to form an oxychloride cement.

As discussed above, the magnesium chloride solution should have a specific gravity in the range from about 20° Baumé to about 30° Baumé, and preferably in the range from about 21° Baumé to about 26° Baumé, depending on the desired strength of the product.

Slight disparities between optimum values of specific gravity and proportions of ingredients may be permissible. Nevertheless, it is strongly urged that the specific gravity of the gauging solution be maintained within a suitable range When the specific gravity of the solution exceeds the suitable range (that is, the solution has a very high degree Baumé) the excess magnesium chloride will tend to absorb the moisture from the atmosphere causing the surface of the cement to expand slightly or otherwise become irregular. Similarly, if the specific gravity of the magnesium chloride solution is below the suitable range, then there will either be unreacted magnesium oxide present which will tend to combine with water in the solution to form magnesium hydroxide or there will be excess water which must evaporate, slowing the curing time of the cement. As discussed above, magnesium hydroxide has no cement bonding properties with the magnesium chloride and water. Therefore, if an excessive amount of magnesium hydroxide is present, fissures and warping tend to occur rendering the quality of the concrete unacceptable.

The following examples further illustrate certain properties and characteristics of the magnesium oxychloride cement compositions within the scope of the present invention. These examples are intended to be purely exemplary of the use of the invention and should not be viewed as a limitation on any claimed embodiment.

EXAMPLE 1

Compression tests were made on similar mixes of magnesium oxychloride cement compositions where the mineral aggregate and magnesium oxide were held constant and the specific gravity of Great Salt Lake brine (magnesium chloride solution) was varied.

The magnesium oxychloride cement compositions were prepared by combining the following ingredients:
 4 oz. #16 silica sand
 4 oz. #30 silica sand
 8 oz. #70 silica sand
 2 oz. #200 silica sand
 4 oz. Magnesium Oxide (oxymag grade)
 6 oz. Great Salt Lake Brine The specific gravity of the Great Salt Lake Brine added to each sample was varied from 16° Baumé to about 30° Baumé. The samples were cured for five (5) days at room temperature (72° F.–75° F.). Compression tests were performed by Pittsburgh Testing Laboratory, Salt Lake City, Utah.

The test results show comparative compressive strength of the compositions having a curing time of 5 days. Table II summarizes the test results.

TABLE II

Magnesium oxychloride cement compositions with mineral aggregate and magnesium oxide held constant and the specific gravity of Great Salt Lake Brine (in degrees Baume) varied

| Baume | Compressive Strength (psi) |
| --- | --- |
| 16 | 1540 |
| 20 | 3310 |
| 24 | 5140 |
| 28 | 5950 (average 2 tests) |
| 30 | 7020 |

Based upon the foregoing and previous tests, the preferable range of specific gravity for the magnesium chloride solution is in the range from about 21° Baumé to about 26° Baumé. This range provides adequate strength for most practicable uses. Several factors are involved in determining the preferable range of specific gravity. One of the most important factors in the use of magnesium oxychloride cements, discussed above, is to achieve the best possible balance between magnesium oxide and magnesium chloride in order to produce a complete chemical reaction.

Another important factor in determining a preferable specific gravity is the total cost of the cement composition. When a higher concentration of magnesium chloride is used, the amount of magnesium oxide must be increased to maintain the stoichiometric balance. If higher concentrations of magnesium chloride and magnesium oxide are used, the cost of the cement product is increased. The costs for the cement composition ingredients should preferably be held as low as possible, commensurate with the desired strength, to make the end products cost-competitive. Increasing the degree of Baumé from 24° to 30° would increase the overall cost of the cement product by about twenty percent (20%).

EXAMPLE 2

Tests were made to determine the increase in compressive strength of similar mixes of magnesium oxychloride cement compositions when a pure magnesium chloride solution was replaced by Great Salt Lake Brine. The pure magnesium chloride solution was purchased from High Valley Chemical Co., Salt Lake City, Utah. Both solutions had a specific gravity of 21° Baumé. The mineral aggregate and magnesium oxide were held constant in each mixture.

The magnesium oxychloride cement compositions were prepared by combining the following ingredients:
 8 oz. #70 Silica Sand
 3 oz. #16 Silica Sand
 2 oz. #30 Silica Sand
 4.5 oz. Magnesium Chloride (pure chemical grade)
The same mix was used for the sample containing Great Salt Lake brine except 3.75 oz. of brine were used to produce the same consistency of mix. The samples were cured for four (4) days at room temperature (72° F.-75° F.). Compression tests were performed by Pittsburgh Testing Laboratory, Salt Lake City, Utah. The test results indicate that the use of Great Salt Lake brine increased the compressive strength up to about 19%. The average increase in compressive strength was found to be about 7%.

It has been found that the cement compositions of the present invention may also be advantageously modified by the addition of acid to the magnesium chloride solution. The addition of acid (preferably in concentrated form so as not to decrease significantly the specific gravity of the solution) appears to result in a more homogeneous cementing reaction. The resulting cement product is not only more weather resistant, but significantly stronger than acid-free magnesium oxychloride cements. Moreover, the addition of concentrated acid tends to shorten the set time, thereby allowing the end user to control the set time. Concentrated hydrochloric acid and sulfuric acid are known to produce these results. It is believed other concentrated acids such as nitric acid and phosphoric acid may also be suitably added to the cement composition for certain applications of the present invention.

EXAMPLE 3

Experimental tests were made to determine the increase in compressive strength of magnesium oxychloride cement compositions when concentrated hydrochloric acid was added to the Great Salt Lake brine. The hydrochloric acid was industrial grade with a concentration of 36%. The Great Salt Lake Brine had a specific gravity of 22° Baumé, and the mineral aggregate and magnesium oxide were held constant in each test mixture.

The tests were made using washed sand (pit run) from A. H Dean ready mix plant in Salt Lake City, Utah. The sand was passed through a #15 screen. This would be typical of sand obtained from local sources. The sand was mainly silica with some limestone. The sand showed a good range of smaller sized aggregate particles.

The magnesium oxychloride cement compositions were prepared by combining the following ingredients:
 10 oz. washed sand minus #15
 1 oz. #200 Silica sand
 2½ oz. Magnesium Oxide (OXYMAG ® grade)
 4 oz. Great Salt Lake brine percent of HCL added to brine by volume 0, 1, 2, 5, 10

The samples were cured for six (6) days at room temperature (72° F.-75° F.). Compression tests were performed by Pittsburgh Testing Laboratory, Salt Lake City, Utah. Table III summarizes the test results. The results indicate that the compressive strength of the cement composition increased when acid was added to the Great Salt Lake Brine up to about 10% by weight of the brine. The maximum increase in compressive strength was observed when about 5% acid was added. The addition of about 5% concentrated hydrochloric acid by weight of the brine increased the compressive strength about 24%.

TABLE III

Magnesium oxychloride cement compositions with mineral aggregate, magnesium oxide, and Great Salt Lake Brine held constant and concentrated hydrochloric acid varied

| % Concentrated HCl | Compressive Strength (psi) |
|---|---|
| 0 | 4940 |
| 1 | 5370 |
| 2.5 | 5130 |
| 5 | 6100 |
| 10 | 5730 |

The choice of aggregate added to magnesium oxychloride cement determines the suitable uses for the resulting product. For example, very light weight aggregates such as perlite, pumice, volcanic ash, vermiculite, etc. are suitable for light-weight insulation-type uses, whereas very dense aggregates such as silica sands are suitable for concrete surface repair uses. The magnesium oxychloride cement compositions within the scope of the present invention may be used with both organic and inorganic (mineral) aggregates, including common soil.

Common mineral aggregates are graded depending upon the size of the aggregate. The grading is typically a number corresponding to the number of divisions or meshes per inch of a large screen. For example, a #8 sand will pass through a screen having 8 divisions per inch or openings of approximately ⅛ squares. Similarly, a #30 sand will pass through a screen having 30 divisions per inch or openings of approximately 1/30" squares. Generally, in grading the mineral aggregates, a number is assigned to the size of aggregate which will pass through the numbered mesh screen, but not the next smaller sized screen.

Specific sizes of mineral aggregate referred to in this specification are intended to be purely exemplary and should not be viewed as a limitation to the precise size mentioned. For example, a reference to #8 silica sand is intended to include those sizes substantially the same as #8 silica sand such as those aggregates having size in the range from about #6 to about #10. Similarly, specific size ranges referred to in this specification such as silica sand having a range from about #8 to about #70 may include #8, #16, #30, #70, or any other standard gradation therebetween.

EXAMPLE 4

Because the ultimate strength of the cement composition comes from the aggregates, tests were made to determine the compressive strength for magnesium oxychloride cement compositions within the scope of the present invention containing aggregates of various sizes. The compositions were all made by mixing magnesium oxide with a magnesium chloride solution having a specific gravity of 23° Baumé such that the ratio of magnesium chloride to magnesium oxide was 1.25:1 by weight. The magnesium oxide to aggregate ratio for the silica sand and washed sand aggregate was 1:4 by weight of aggregate. The compositions were cured for five (5) days at room temperature (72° F.–75° F.). Test results are reported in Table IV.

TABLE IV

| Type of Aggregate | Compressive Strength (psi) |
|---|---|
| #70 silica sand | 3470 |
| #30 silica sand | 5480 |
| #16 silica sand | 6690 |
| #8 silica sand | 9490 |
| #8 washed sand | 6240 |
| perlite (coarse) | 1590 |
| pumice (fine) | 3180 |

The results shown in Table IV illustrate that generally larger aggregates will produce a stronger product. In addition, the type and quality of the aggregate effect the ultimate strength of the cement composition. For example, perlite and pumice are very lightweight aggregates that are not individually as strong as silica sand. Similarly, #8 silica sand is significantly stronger than #8 washed sand. The washed sand was common sand that had not been graded and sized as accurately as the silica sand and contained some limestone and less dense minerals.

The light-weight aggregates have high absorption which varies considerably with the size of the aggregate and is not constant. Therefore, a higher ratio of magnesium chloride to magnesium oxide is usually required to produce a workable mix. Generally the proper mix is determined by trial laboratory tests when different sources of aggregate are used.

The aggregates used in the composition for patching or repairing damaged concrete surfaces within the scope of the present invention are carefully selected to minimize the voids or interstitial spaces between the aggregate particles. For example, if the composition is to be applied in a thickness less than about one inch, #8 silica sand is the principal aggregate component. Knowing the volume of #8 silica sand added, as well as the specific gravity and density of the sand, the total volume of the voids between the sand particles is calculated. The quantity of smaller sized silica sand (#16 for example) which would fill the voids between the #8 silica sand is then calculated. Similarly, the volume of the voids between the #16 silica sand particles is determined and the quantity of a next smaller sized sand (#30 for example) is calculated. The process is repeated to determine the quantity of a still smaller sized silica sand (#70 for example) which would fill the voids between the #30 silica sand.

Because the amount of aggregate per unit volume is maximized in the concrete repair composition, the required amount of magnesium oxychloride cement per unit volume is minimized. The resulting composition possesses exceptionally high strength from the dense aggregates. In addition, the composition is very water resistant compared to other concrete compositions.

As discussed above, the concrete repair compositions within the scope of the present invention is ideally suited for repairing damaged concrete surfaces. The high bond strength, high compressive strength, quick cure time, and a coefficient of expansion similar to Portland Cement concrete are important characteristics of the present invention which enable efficient repair of damaged concrete surfaces.

The use of concrete repair compositions within the scope of the present invention will be further clarified by a consideration of the following examples, which are intended to be purely exemplary of the use of the invention and should not be viewed as a limitation on any claimed embodiment.

EXAMPLE 5

A concrete repair composition was prepared by combining the following ingredients:

| | |
|---|---|
| MgO | 75 lbs (OXYMAG ® grade) |
| MgCl₂ (brine) | 8 gallons @ 24° Baume |
| #8 silica sand | 100 lbs. |
| #16 silica sand | 40 lbs. |
| #30 silica sand | 40 lbs. |
| #70 silica sand | 50 lbs. |
| #200 silica sand | 5 lbs. |
| concentrated HCl (industrial grade, 36%) | 1.5 lbs. |

The foregoing ingredients produced a magnesium oxychloride cement composition suitable for concrete repair and patching.

EXAMPLE 6

A concrete repair composition, prepared according to the procedure of Example 5, was applied to an area of a damaged warehouse floor to test its effectiveness under heavy use. The warehouse floor was subjected to heavy use by forklifts which pull loaded trailers. The forklifts and trailers had small hard rubber-surfaced and steel wheels which resulted in a heavy load concentration. The heavy loads caused the surface to spall. The existence of spalled areas with exposed aggregate, caused the forklifts and trailers to vibrate and hammer the surface, exacerbating the problem.

The damaged surface of a test section located in a heavy traffic area was removed to a depth of ¼ inch. The concrete repair composition was laid in the test section by 6:30 p.m. By 8:00 a.m. the following morning, the test section was subjected to full traffic. Follow up observations after three (3) months showed little wear of the test section. There was no evidence of debonding or breaking up.

EXAMPLE 7

A sample of concrete repair composition prepared according to the procedure of Example 5 was subjected to independent compression tests after curing for 1, 2, and 6 days at room temperature (72° F.-75° F.), with the following results:

| Cure time (days) | Compressive strength (psi) |
| --- | --- |
| 1 | 5806 |
| 2 | 10130 |
| 6 | 10955 |

These results indicate that the concrete repair composition possesses a very high early strength. In just 24 hours the concrete repair composition achieved a compression strength exceeding the compression strength of typical Portland cement compositions which have cured for twenty-eight (28) days.

EXAMPLE 8

A concrete repair composition within the scope of the present invention was prepared by mixing the following ingredients:

| | |
| --- | --- |
| magnesium oxide (OXYMAG ® grade) | 11 lbs. |
| #30 silica sand | 3 lbs. |
| #70 silica sand | 26 lbs. |
| #200 silica sand | 3 lbs. |
| Great Salt Lake brine @ 24° Baume | 10 lbs. (1 gal.) |

The foregoing ingredients produced a magnesium oxychloride cement composition suitable for patching small spalled areas on sidewalks, steps, patios, garage floors, etc., and for repairing chipped corners, cracks, and resurfacing small areas. The formula was tested by patching spalled areas in a storage yard, sidewalk, roadway curb, replacing a damaged corner on the doorway to a storage room, and resurfacing a badly worn sill on a loading dock. Subsequent examination of these areas indicates very little damage by use or climatic conditions.

Admixtures may be included in the concrete repair compositions of the present invention to alter physical characteristics of the resulting product. For example, it may be desirable for the composition to expand slightly upon curing, in which case sodium fluoride may be suitably added to the composition. In addition, mineral oxides and acrylic pigment, or other means for coloring the cement composition may be added depending on the desired end use.

It has been found that the addition of a small quantity of Portland cement to the magnesium oxychloride cement compositions within the scope of the present invention accelerates the curing rate of the cement composition. This feature permits the user to accurately control the time between mixing and curing of the cement composition.

EXAMPLE 9

The ratio of cement to aggregate also affects the compression strength of the resulting magnesium oxychloride cement composition. Tests were made to determine the increase in compressive strength for 6 concrete mixes where the ratio of magnesium oxide to aggregate by weight varied from 1:3 to 1:8. The magnesium chloride solution was held constant.

The various magnesium oxychloride cement compositions were prepared by combining the following ingredients:

Ratio 1:3

15 oz. washed sand—#15 mesh
5 oz. magnesium oxide (OXYMAG ® grade)
5 oz. Great Salt Lake brine @21° Baumé

The washed sand used was examined to determine if desirable sizes of aggregate were present. Sand sizes in the range from about #15 to about #100 were observed, thereby providing a reasonably good mix.

Ratio 1:4

12 oz. washed sand—#15 mesh
3 oz. Great Salt Lake brine @21° Baumé
3 oz. magnesium oxide (OXYMAG ® grade)

Ratio 1:5

10 oz. washed sand—#15 mesh
2 oz. magnesium oxide (OXYMAG ® grade)
2 oz. Great Salt Lake brine @21° Baumé

Ratio 1:6

12 oz. washed sand—#15 mesh
2 ox. magnesium oxide (OXYMAG ® grade)
2 oz. Great Salt Lake brine @21° Baumé

Ratio 1:8

16 oz. washed sand—#15 mesh
2 oz. magnesium oxide (OXYMAG ® grade)
2 oz. Great Salt Lake brine @21° Baumé

The magnesium oxide used in all tests was OXYMAG ® grade manufactured by Basic Chemical Co., Gabbs, Nevada. The magnesium oxide is manufactured from magnesite ore and dead burned to ASTM standards especially for use as a cement. This is the best grade available and gives the most consistent results. Most known magnesium oxychloride cement compositions use Basic Chemical Co.'s HR325 grade which is only light burned. This grade is less chemically active and is ground to −325 sieve compared to −400 sieve for the oxymag grade.

The test samples were cured for five (5) days at room temperature (72° F.-75° F.). Compression tests were performed by Pittsburgh Testing Laboratory, Salt Lake City, Utah. Test results are reported in Table V.

TABLE V

Magnesium oxychloride cement compositions with mineral aggregate and magnesium chloride held constant and the ratio of magnesium oxide to aggregate varied.

| Ratio of MgO to Aggregate | Compressive Strength (psi) |
| --- | --- |
| 1:8 | 3800 |
| 1:6 | 5050 |
| 1:5 | 5750 |
| 1:4 | 6140 |
| 1:3 | 8050 |

Test results, which are shown in Table V, indicate a gradual increase in strength from the 1:8 to 1:4 ratios, then an abrupt increase in strength from the 1:4 to 1:3 ratio. This indicates that a better balance of cement, gauging solution, and aggregate exists and a more complete chemical reaction occurs at a ratio in the range from about 1:3 to about 1:4.

EXAMPLE 10

Tests were performed to determine the bond of a magnesium oxychloride cement composition within the scope of the present invention to six (6) common substrates. The magnesium oxychloride cement composition was prepared by combining the following ingredients:

2 oz. #16 silica sand
2 oz. #30 silica sand
8 oz. #70 silica sand
1 oz. #200 silica sand
3 oz. magnesium oxide (OXYMAG ® grade)
3 oz. Great Salt Lake brine @23° Baumé

After curing, the bond strength to the substrate was determined. Test results are reported in Table VI.

TABLE VI

Magnesium oxychloride cement composition applied to various common substrates.

| Substrate | Bond Strength (psi) |
| --- | --- |
| Wallboard | 4 |
| Fiberboard | 7 |
| D. F. Plywood | 42 |
| Concrete Block | 70 |
| Concrete | 184 |
| Smooth reinforcing Steel | 1088 |

In all of the substrates except steel, failure occurred in the substrate rather than in the cement composition. This indicates that the cement composition and the bond to the substrate were stronger than the substrate itself. From the results of Table VI, it is apparent that the magnesium oxychloride cement compositions within the scope of the present invention form high strength bonds to various common substrates. Although not shown in Table VI, magnesium oxychloride cement compositions of the present invention form a very strong bond with stone, comparable to the bond with concrete.

The high bond strength makes magnesium oxychloride cement compositions within the scope of the present invention ideally suited for both concrete repair and stucco applications. A major problem with existing concrete repair compositions is that the bond between the composition and the existing concrete is relatively weak. Similarly, existing stucco compositions require stucco wire for support.

In contrast to existing stucco compositions, the stucco compositions within the scope of the present invention may be applied directly to the substrate without stucco wire or paper. Conventional wisdom teaches that stucco wire and some moisture barrier, such as Kraft paper, exist between the stucco composition and the substrate. The stucco wire is for support and the barrier is to separate the rigid stucco composition from the substrate. The reason why current stucco compositions are preferably separated from the substrate is because many stucco substrates expand, contract, or flex to one degree or another over time. Such movement of the substrate would cause typical stuccos to crack or fail if applied directly to the substrate.

It has been found that the magnesium oxychloride cement stucco compositions within the scope of the present invention flex sufficiently to permit them to be applied directly to substrates without fear of subsequent cracking. Due to this high flexibility combined with high bondability, the stucco compositions within the scope of the present invention do not require stucco wire or paper, unless required by local building codes, but may be applied directly to the substrate surface where the wall structure provides a moisture barrier, or where the structure use does not require it. As a result, they may be applied faster and at a reduced cost than conventional stuccos.

Moreover, the stucco compositions within the scope of the present invention may be applied in a single coat as opposed to multiple coats required by currently known stucco compositions. Because of the high strength and low absorbence of less than 5%, the stucco compositions of the present invention may be applied with a thickness reduced to ⅜ inch in moderate climates. Furthermore, it has been found that the stucco compositions within the scope of the present invention do not "photograph" underlying mortar joints when applied over concrete blocks.

The stucco compositions within the scope of the present invention may be sprayed onto the substrate surface or troweled. Generally, to be sprayed the stucco composition should have a lower viscosity than a troweled stucco composition. This typically requires additional brine to be added. Because of the importance of preserving the proper stoichiometric balance between magnesium oxide and the magnesium chloride solution, if more brine is added to the cement composition, a proportional quantity of magnesium oxide should also be added. The net effect is that a sprayed stucco composition will have a smaller percentage of aggregates than a troweled stucco composition.

EXAMPLE 11

The stucco compositions within the scope of the present invention may be marketed pre-mixed in standard 75 to 100 pound bags. One such pre-mixed stucco formulation for use in a 1 to 2 bag mortar mixer includes the following ingredients:

| | |
| --- | --- |
| Magnesium oxide | 75 lbs. |
| #8 silica sand | 35 lbs. |
| #16 silica sand | 30 lbs. |
| #30 silica sand | 30 lbs. |
| #70 silica sand | 180 lbs. |
| #200 silica sand | 20 lbs. |
| Great Salt Lake brine @ 24° Baume | 10 gallons |
| HCl (industrial grade, 36%) | 0.5 lbs. |

Test results for this mix indicate a compressive strength of 7,600 p.s.i. and absorption rate of about 3% to about 5%. Sprayed application requires smaller aggregate and a more fluid mix. As a result the compressive strength will be somewhat less and absorption rate slightly higher.

The above formulation is typical for a troweled application of one-half inch or more. For thinner applications it is desirable to adjust the mix for finer aggregate particles. Depending on the substrate it may be necessary to increase the smaller size aggregate and eliminate the #8 sand. The coarse sizes makes it more difficult to trowel.

The magnesium oxychloride cement compositions within the scope of the present invention are particularly adapted for casting various ornamental and functional products. For example, landscaping products including precast post and panels for fencing, stepping stones, lawn edging, slope protectors, cast fountains, ornaments, splash blocks, shrub and flower pots, etc. can be produced from the cement compositions of the present invention. A variety of other products including hollow building blocks, slabs, bricks, parking lot bumpers, meter boxes, mantel and hearth stones, terrazzo, burial vaults, porcelain finish castings, light weight insulating, and fireproof products, etc. may also be produced by the cement compositions within the scope of the present invention.

As discussed above, the choice of aggregates determines the type of products which may be produced by the cement compositions. For example, if the castable product does not require high strength or other special characteristics, inexpensive aggregates may be used in connection with a "lean" cement mixture. On the other hand, if the cement product is to have a porcelain-like finish, then higher quality aggregates and controlled cement compositions are important.

Typical castable concrete compositions within the scope of the present invention include about 10% to about 25% magnesium oxide, 15% to about 45% magnesium chloride solution, and a combination of different sized aggregate particles. Concentrated acid, up to about 10% of the magnesium chloride solution by weight, may also be added to the castable concrete composition to increase the strength and water resistance of the composition. The magnesium chloride solution preferably has a specific gravity in the range from about 20% Baumé to about 30% Baumé.

For large castings where semirough or rough surfaces are acceptable, coarse aggregate up to pea gravel or ⅜ inch size will provide high strength and low absorption. For small, delicate or intricate castings, aggregate sizes comparable to about #30 or finer would be required. In some instances a maximum size aggregate of #50 or #70 would be required for very detailed castings.

For instance, when a large vase or urn is cast and it is desired to have the aggregate show on the surface, #8 aggregate would be used. For this type of casting where a smooth, bubble-free surface is desired, it has been found that spinning the cement mixture within the mold eliminates any air bubbles which might otherwise form on the surface. In the process, the aggregate is forced to the outside surface against the mold by centrifugal force and any air bubbles at the surface are forced to the interior of the casting.

It has been found that different sized aggregate particles containing #8 and #16 silica sand included in the castable concrete composition within the scope of the present invention produces high quality castings of both functional and ornamental products. In the case of castings having a porcelain-like finish, there is no need for firing or glazing the product. It has also been found that an exceptionally smooth and accurate casting may be achieved by including smaller sized silica sand, such as #70 and #200 silica sand, into the castable concrete composition.

It has been found that thorough mixing of the foregoing magnesium oxychloride cement compositions within the scope of the present invention is important to consistently obtain a complete chemical reaction. Experience has shown that a mortar type mixer is preferred over a concrete mixer, since the cement compositions of the present invention generally use smaller sized aggregates. The mixing time preferably should not be less than 1½ minutes nor more than 3 minutes. Best results are obtained by placing the magnesium chloride solution or brine in the mixer first and then adding the aggregate and cement. This procedure results in a more uniform mix and helps to prevent unmixed material sticking to the mixer blades and shaft, which maintains the efficiency of the mixer and reduces cleanup time.

When ambient temperature is above 85 degrees Fahrenheit it is recommended that the mixer, transporting and/or pumping equipment, and placing tools should be cleaned and flushed with water every two or three hours. If the magnesium oxychloride cement compositions are allowed to dry on steel, it is difficult and time consuming to remove. When the temperature is 100 degrees Fahrenheit or more it is advisable to chill the magnesium oxychloride solution, use a canopy over the mixer, and keep the aggregate in the shade.

From the foregoing, it will be appreciated that the present invention provides cement compositions which possess a high structural strength, and yet have a high bonding strength to common substrates.

Additionally, it will be appreciated that the present invention provides relatively fast setting cement compositions, but which do not set so fast as to prevent adequate "working" of the compositions to form the desired end product. The present invention also provides cement compositions which do not shrink upon setting in order that a good bond can be formed with the adjacent surface, such as when used to repair deteriorating concrete road surfaces.

Likewise, it will be appreciated that the present invention provides cement compositions which are resistant to weather exposure, including heat, ultraviolet rays, and deicing salts.

It will also be appreciated that the present invention provides cement compositions which do not require special curing compositions or techniques that would inhibit their use for common construction projects.

In addition, it will be appreciated that the present invention provides cement stucco compositions which can be applied directly to a substrate surface without the need of costly stucco wire and without the need of labor intensive multiple coatings of the stucco compositions. The present invention also provides cement compositions which can be cast into both functional and ornamental products and which can produce a porcelain-like finished surface without the need for firing or glazing the product.

Finally, it will be appreciated that the present invention provides cement compositions for repairing damaged and deteriorating concrete surfaces.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A composition for repairing damaged concrete surfaces produced by combining ingredients comprising:

a magnesium oxide composition having a weight percent of the concrete repair composition in the range from about 15% to about 30%, said magnesium oxide composition containing salt or mineral impurities other than magnesium oxide, the total amount of said impurities being in the range from about 5% to about 20% of the magnesium oxide composition;

a magnesium chloride brine solution having a specific gravity in the range from about 20° Baumé to about 30° Baumé, said magnesium chloride brine solution having a weight percent of the concrete repair composition in the range from about 15% to about 25%, said magnesium chloride brine solution containing salt or mineral impurities other than magnesium chloride, the total amount of said impurities being in the range from about 5% to about 20% of the magnesium chloride brine solution;

acid having a weight percent of the magnesium chloride solution in the range from about 1% to about 10%; and a combination of different sized aggregate particles selected to minimize voids and interstitial spaces between said aggregate particles thereby forming a dense concrete repair composition, wherein the ratio of magnesium oxide to aggregate particles is in the range from about 1:2 to about 1:5.

2. A composition for repairing damaged concrete surfaces as defined in claim 1, where the acid comprises hydrochloric acid.

3. A composition for repairing damaged concrete surfaces as defined in claim 1, wherein the acid comprises sulphuric acid.

4. A composition for repairing damaged concrete surfaces as defined in claim 1, wherein the acid has a weight percent of the magnesium chloride brine solution from about 4% to about 6%.

5. A composition for repairing damaged concrete surfaces as defined in claim 2, wherein the hydrochloric acid has a weight percent of the magnesium chloride brine solution from about 4% to about 6%.

6. A composition for repairing damaged concrete surfaces as defined in claim 1, wherein the magnesium chloride brine solution comprises brine from the Great Salt Lake.

7. A composition for repairing damaged concrete surfaces as defined in claim 1, wherein the magnesium chloride brine solution has a specific gravity in the range from about 21° Baumé to about 26° Baumé.

8. A composition for repairing damaged concrete surfaces as defined in claim 6, wherein the Great Salt Lake brine has a specific gravity in the range from about 21° Baumé to about 26° Baumé.

9. A composition for repairing damaged concrete surfaces as defined in claim 1, wherein the ratio of magnesium oxide composition to aggregate particles is in the range from about 1:3 to about 1:4.

10. A composition for repairing damaged concrete surfaces as defined in claim 1, wherein the ratio of magnesium oxide composition to magnesium chloride solution is in the range from about 1:1.5 to about 1.3:1.

11. A composition for repairing damaged concrete surfaces as defined in claim 1, wherein the combination of different sized aggregate particles comprises silica sand.

12. A composition for repairing damaged concrete as defined in claim 11, wherein the combination of different sized aggregate particles comprise:

silica sand in the range from about 20% to about 30% of the total concrete repair composition weight having a size comparable to about #8 silica sand;

silica sand in the range from about 5% to about 15% of the total concrete repair composition weight having a size comparable to about #16 silica sand;

silica sand in the range from about 5% to about 15% of the total concrete repair composition weight having a size comparable to about #30 silica sand;

silica sand in the range from about 5% to about 15% of the total concrete repair composition weight having a size comparable to about #70 silica sand; and silica sand in the range from about 0.5% to about 2% of the total concrete repair composition weight having a size comparable to about #200 silica sand.

13. A composition for repairing damaged concrete as defined in claim 11, wherein the combination of different sized aggregate particles comprise:

silica sand in the range from about 5% to about 15% of the total concrete repair composition weight having a size comparable to about #16 silica sand;

silica sand in the range from about 1% to about 10% of the total concrete repair composition weight having a size comparable to about #30 silica sand;

silica sand in the range from about 40% to about 50% of the total concrete repair composition weight having a size comparable to about #70 silica sand; and silica sand in the range from about 1% to about 10% of the total concrete repair composition weight having a size comparable to about #200 silica sand.

14. A composition for repairing damaged concrete surfaces produced by combining ingredients comprising:

a magnesium oxide composition having a weight percent of the concrete repair composition in the range from about 15% to about 30%, said magnesium oxide composition containing salt or mineral impurities other than magnesium oxide, the total amount of said impurities being in the range from about 5% to about 20% of the magnesium oxide composition;

magnesium chloride brine solution having a specific gravity in the range from about 20° Baumé to about 30° Baumé, said magnesium chloride brine solution having a weight percent of the concrete repair composition in the range from about 15% to about 25%, said magnesium chloride brine solution containing salt or mineral impurities other than magnesium chloride, the total amount of said impurities being in the range from about 5% to about 20% of the magnesium chloride brine solution; and a combination of differently sized aggregate particles selected to minimize voids and interstitial spaces between said aggregate particles thereby forming a dense concrete repair composition, wherein the ratio of magnesium oxide to aggregate particles is in the range from about 1:2 to about 1:5.

15. A composition for repairing damaged concrete surfaces as defined in claim 14, wherein the magnesium chloride brine solution has a specific gravity in the range of about 21° Baumé to about 26° Baumé.

16. A composition for repairing damaged concrete surfaces as defined in claim 14 wherein the ratio of magnesium composition oxide to aggregate particles is in the range from about 1:3 to about 1:4.

17. A composition for repairing damaged concrete surfaces as defined in claim 14, wherein the ratio of magnesium oxide to magnesium chloride brine solution in is in the range from about 1:1.5 to about 1.3:1.

18. A composition for repairing damaged concrete surfaces as defined in claim 14, wherein the magnesium chloride brine solution comprises brine from the Great Salt Lake.

19. A composition for repairing damaged concrete surfaces as defined in claim 14, wherein the combination of different sized aggregate particles comprises silica sand.

20. A composition for repairing damaged concrete as defined in claim 19, wherein the combination of different sized aggregate particles comprise:
   silica sand in the range from about 20% to about 30% of the total concrete repair composition weight having a size comparable to about #8 silica sand;
   silica sand in the range form about 5% to about 15% of the total concrete repair composition weight having a size comparable to about #16 silica sand;
   silica sand in the range from about 5% to about 15% of the total concrete repair composition weight having a size comparable to about #30 silica sand;
   silica sand in the range from about 5% to about 15% of the total concrete repair composition weight having a size comparable to about #70 silica sand; and
   silica sand in the range from about 0.5% to about 2% of the total concrete repair composition weight having a size comparable to about #200 silica sand.

21. A composition for repairing damaged concrete as defined in claim 19, wherein the combination of different sized aggregate particles comprise:
   silica sand in the range from about 5% to about 15% of the total concrete repair composition weight having a size comparable to about #16 silica sand;
   silica sand in the range from about 1% to about 10% of the total concrete repair composition weight having a size comparable to about #30 silica sand;
   silica sand in the range from about 40% to about 50% of the total concrete repair composition weight having a size comparable to about #70 silica sand; and
   silica sand in the range from about 1% to about 10% of the total concrete repair composition weight having a size comparable to about #200 silica sand.

22. A composition for applying a stucco coating on a substrate surface produced by combining ingredients comprising:
   magnesium oxide having a weight percent of the stucco composition in the range from about 10% to about 30%, said magnesium oxide composition containing salt or mineral impurities other than magnesium oxide, the total amount of said impurities being in the range from about 5% to about 20% of the magnesium oxide composition;
   a magnesium chloride brine solution having a specific gravity in the range from about 20° Baumé to about 30° Baumé and having a weight percent of the stucco composition in the range from about 15% to about 25%, said magnesium chloride brine solution containing salt or mineral impurities other than magnesium chloride, the total amount of said impurities being in the range from about 5% to about 20% of the magnesium chloride brine solution;
   acid having a weight percent of the magnesium chloride solution in the range from about 1% to about 10%; and
   a combination of different sized aggregate particles having a weight percent of the stucco composition in the range from about 55% to about 75%.

23. A composition for applying a stucco coating on a substrate surface as defined in claim 2, wherein the acid comprises hydrochloric acid.

24. A composition for applying a stucco coating on a substrate surface as defined in claim 22, wherein the acid comprises sulfuric acid.

25. A composition for applying a stucco coating on a substrate surface as defined in claim 22, wherein the acid has a weight percent of the magnesium chloride brine solution composition in the range from about 1% to about 6%.

26. A composition for applying a stucco coating on a substrate surface as defined in claim 23, wherein the hydrochloric acid has a weight percent of the magnesium chloride brine solution in the range from about 1% to about 6%.

27. A composition for applying a stucco coating on a substrate surface as defined in claim 22, wherein the magnesium chloride brine solution comprises brine from the Great Salt Lake.

28. A composition for applying a stucco coating on a substrate surface as defined in claim 22, wherein the magnesium chloride brine solution has a specific gravity in the range from about 21° Baumé to about 26° Baumé.

29. A composition for applying a stucco coating on a substrate surface as defined in claim 27, wherein the brine from the Great Salt Lake has a specific gravity in the range from about 21° Baumé to about 26° Baumé.

30. A composition for applying a stucco coating on a substrate surface as defined in claim 22, wherein the ratio of magnesium oxide composition to aggregate is in the range from about 1:3 to about 1:6.

31. A composition for applying a stucco coating on a substrate surface as defined in claim 22, wherein the ratio of magnesium oxide composition to magnesium chloride brine solution is in the range from about 1:1.5 to about 1.3:1.

32. A composition for applying a stucco coating on a substrate surface as defined in claim 22, wherein the combination of different sized aggregate particles comprise silica sand.

33. A composition for applying a stucco coating on a substrate surface as defined in claim 32, wherein the combination of different sized aggregate particles comprise:
   silica sand in the range from about 5% to about 10% of the total stucco composition weight having a size comparable to about #8 silica sand;
   silica sand in the range from about 5% to about 15% of the total stucco composition weight having a size comparable to about #16 silica sand;
   silica sand in the range from about 5% to about 15% of the total stucco composition weight having a size comparable to about #30 silica sand;
   silica sand in the range from about 30% to about 45% of the total stucco composition weight having a size comparable to about #70 silica sand; and
   silica sand in the range from about 1% to about 10% of the total stucco composition weight having a size comparable to about #200 silica sand.

34. A composition for casting concrete products produced by combining ingredients comprising:
   magnesium oxide having a weight percent of the concrete composition in the range from about 10% to about 25%, said magnesium oxide composition containing salt or mineral impurities other than magnesium oxide, the total amount of said impurities being in the range from about 5% to about 20% of the magnesium oxide composition:

magnesium chloride brine solution having a specific gravity in the range from about 20° Baumé to about 30° Baumé, said magnesium chloride brine solution having a weight percent of the concrete composition in the range from about 15% to about 40%, said magnesium chloride brine solution containing salt or mineral impurities other than magnesium chloride, the total amount of said impurities being in the range from about 5% to about 20% of the magnesium chloride brine solution;

acid having a weight percent of the concrete composition in the range from about 1% to about 10%; and a combination of different sized aggregate particles selected to minimize voids and interstitial spaces between said aggregate particles having a weight percent of the concrete composition in the range from about 50% to about 75%.

35. A composition for casting concrete products as defined in claim 34, wherein the different sized aggregate particles further comprise silica sand having sizes in the range from about #8 silica sand to about #200 silica sand.

36. A composition for repairing damaged concrete surfaces as defined in claim 34, wherein the magnesium chloride brine solution comprises brine from the Great Salt Lake.

37. A composition for casting concrete products produced by combining ingredients comprising:

magnesium oxide having a weight percent of the concrete composition in the range from about 10% to about 25%, said magnesium oxide composition containing salt or mineral impurities other than magnesium oxide, the total amount of said impurities being in the range from about 5% to about 20% of the magnesium oxide composition;

a magnesium chloride brine solution having a specific gravity in the range from about 20° Baumé to about 30° Baumé, said magnesium chloride brine solution having a weight percent of the concrete composition in the range from about 15% to about 40%, said magnesium chloride brine solution containing salt or mineral impurities other than magnesium chloride, the total amount of said impurities being in the range from about 5% to about 20% of the magnesium chloride brine solution; and a combination of different sized aggregate particles selected to minimize voids and interstitial spaces between said aggregate particles having a weight percent of the concrete composition in the range from about 50% to about 75%.

38. A composition for casting concrete products as defined in claim 37, wherein the different sized aggregate particles further comprise silica sand having sizes in the range from about #8 silica sand to about #200 silica sand.

39. A composition for repairing damaged concrete surfaces as defined in claim 37, wherein the magnesium chloride brine solution comprises brine from the Great Salt Lake.

40. A magnesium oxychloride cement composition produced by combining ingredients comprising:

a magnesium oxide composition, said magnesium oxide composition containing salt or mineral impurities other than magnesium oxide, the total amount of said impurities being in the range from about 5% to about 20% of the magnesium oxide composition;

a magnesium chloride brine solution having a specific gravity in the range from about 20° Baumé to about 30° Baumé, said magnesium chloride brine solution having a ratio by weight with the magnesium oxide composition in the range from about 1:2 to about 2:1., said magnesium chloride brine solution containing salt or mineral impurities other than magnesium chloride, the total amount of said impurities being in the range from about 5% to about 20% of the magnesium chloride brine solution; and a combination of different sized aggregate particles selected to minimize voids and interstitial spaces between said aggregate particles, said aggregate particles having a ratio by weight with the magnesium oxide in the range from about 2:1 to about 5:1.

41. A composition for repairing damaged concrete surfaces as defined in claim 40, wherein the magnesium chloride brine solution comprises brine from the Great Salt Lake.

42. A composition for applying a stucco coating on a substrate surface produced by combining ingredients comprising:

a magnesium oxide composition having a weight percent of the stucco composition in the range from about 10% to about 30%, said magnesium oxide composition containing salt or mineral impurities other than magnesium oxide, the total amount of said impurities being in the range form about 5% to about 20% of the magnesium oxide composition;

a magnesium chloride brine solution having a specific gravity in the range from about 20° Baumé to about 30° Baumé and having a weight percent of the stucco composition in the range from about 15% to about 25%, said magnesium chloride brine solution containing salt or mineral impurities other than magnesium chloride, the total amount of said impurities being in the range from about 5% to about 20% of the magnesium chloride brine solution; and a combination of different sized aggregate particles having a weight percent of the stucco composition in the range from about 55% to about 75%.

* * * * *

UNITED STATES PATENT AND TRADEMARK OFFICE
CERTIFICATE OF CORRECTION

PATENT NO. : 5,004,505
DATED : April 2, 1991
INVENTOR(S) : Russell I. Alley et al.

It is certified that error appears in the above-identified patent and that said Letters Patent is hereby corrected as shown below:

```
Column  1, line 30, after "together" insert --.--
Column  1, line 31, "on" should be --upon--
Column  1, line 65, after "surfaces" insert --.--
Column  2, line 16, "effected" should be --affected--
Column  2, line 45, after "joints" insert --.--
Column  4, line 49, before "reduce" insert --to--
Column  7, line 30, "saving" should be --savings--
Column  7, line 48, "separately" should be --separate--
Column  8, line  2, after "range" insert --.--
Column  8, line 40, "oxymag grade" should be --OXYMAG® grade--
Column 10, line  8, after "H" insert --.--
Column 10, line 19, "percent of HCL . . ." should begin a new line
Column 10, line 61, "1/8 squares." should be --1/8" squares--
Column 11, line 40, "effect" should be --affect--
Column 11, line 49, "light-weight" should be --lightweight--
Column 14, line 44, "oxymag grade" should be --OXYMAG® grade--
Column 16, line  5, delete "than" and insert therefor --compared to--
Column 16, line 40, after "magnesium oxide" insert --(OXYMAG® grade--
Column 16, lines 51-52, "absorption rate slightly higher." should
be --the absorption rate will be slightly higher.--
Column 17, line  3, "light weight" should be --lightweight--
```

Signed and Sealed this

Second Day of February, 1993

*Attest:*

STEPHEN G. KUNIN

*Attesting Officer*     *Acting Commissioner of Patents and Trademarks*